(12) United States Patent
Horn

(10) Patent No.: US 7,270,847 B2
(45) Date of Patent: Sep. 18, 2007

(54) SYSTEM AND METHOD FOR COATING TUBES

(75) Inventor: Michael J. Horn, Dedham, MA (US)

(73) Assignee: Plastocor, Inc., Hingham, MA (US)

( * ) Notice: Subject to any disclaimer, the term of this patent is extended or adjusted under 35 U.S.C. 154(b) by 0 days.

(21) Appl. No.: 11/156,090

(22) Filed: Jun. 17, 2005

(65) Prior Publication Data

US 2005/0287294 A1 Dec. 29, 2005

Related U.S. Application Data

(60) Provisional application No. 60/637,879, filed on Dec. 20, 2004, provisional application No. 60/637,789, filed on Dec. 20, 2004, provisional application No. 60/580,930, filed on Jun. 18, 2004.

(51) Int. Cl.
  B05D 7/22 (2006.01)
  B05D 3/12 (2006.01)
  B05C 11/02 (2006.01)

(52) U.S. Cl. ............ 427/230; 427/355; 427/358

(58) Field of Classification Search ......... 427/230, 427/235, 355, 358, 348, 350, 407.1, 410, 427/237; 118/105, 317, DIG. 10, DIG. 13
See application file for complete search history.

(56) References Cited

U.S. PATENT DOCUMENTS

| 4,069,535 A | * | 1/1978 | Cato ............... 15/104.061 |
|---|---|---|---|
| 4,335,677 A | | 6/1982 | Nagata et al. |
| 4,368,219 A | | 1/1983 | Nagata et al. |
| 4,421,790 A | | 12/1983 | Nagata et al. |
| 4,425,385 A | * | 1/1984 | Coulter et al. ......... 427/238 |
| 4,427,034 A | | 1/1984 | Nagata et al. |
| 4,548,258 A | | 10/1985 | Nelson et al. |
| 4,774,905 A | * | 10/1988 | Nobis ................ 118/304 |
| 5,230,842 A | * | 7/1993 | Munde ................ 264/34 |
| 5,326,400 A | * | 7/1994 | Sagawa ............... 118/105 |
| 5,544,698 A | | 8/1996 | Paulman |

(Continued)

FOREIGN PATENT DOCUMENTS

JP 62-191077 8/1987

(Continued)

OTHER PUBLICATIONS

Horn, M.J., et al., "Condenser Tube Coating as a Means of Life Extension and Performance Enhancement," *1996 EPRI Condenser Technology Conference.*

(Continued)

*Primary Examiner*—William Phillip Fletcher, III
(74) *Attorney, Agent, or Firm*—McCormick, Paulding & Huber LLP

(57) ABSTRACT

The present invention relates to the coating of tubes, and more particularly to a system and method for renovating the inner surface of deteriorated or pitted tubes to extend tube life and enhance performance. A method of the present invention includes first providing a coating material in a tube. A pig device is then positioned in the tube, the pig device being sized and orientated to disperse the coating material along the tube's inner service. The pig device is then motivated through the tube to apply the coating material to form a coating on the inner surface.

22 Claims, 6 Drawing Sheets

U.S. PATENT DOCUMENTS

| | | | |
|---|---|---|---|
| 5,709,503 A | | 1/1998 | Manlow |
| 5,879,456 A | | 3/1999 | Curran |
| 5,911,828 A | | 6/1999 | Curran |
| 5,924,913 A | | 7/1999 | Reimelt |
| 6,117,242 A | | 9/2000 | Kreiselmaier |
| 6,145,150 A | * | 11/2000 | Knapp .................. 15/104.061 |
| 6,263,534 B1 | * | 7/2001 | McCann et al. .............. 15/3.5 |
| 6,739,950 B1 | | 5/2004 | Kruse |
| 6,755,916 B1 | * | 6/2004 | Pruett ........................... 134/8 |

FOREIGN PATENT DOCUMENTS

| | | | |
|---|---|---|---|
| JP | 09-201560 A | * | 8/1997 |
| JP | 2001-191045 A | * | 7/2001 |
| JP | 2003-284989 A | * | 10/2003 |

OTHER PUBLICATIONS

Office Action from the U.S. Patent and Trademark Office, dated May 22, 2007, Examiner Laura Estelle Edwards, U.S. Appl. No. 11/155,462.

* cited by examiner

SYSTEM AND METHOD FOR COATING TUBES

RELATED APPLICATION

This application claims priority to, and the benefit of, now abandoned U.S. Provisional Application No. 60/637,879, filed on Dec. 20, 2004, U.S. Provisional Application No. 60/637,789, filed on Dec. 20, 2004 and U.S. Provisional Application No. 60/580,930, filed on Jun. 18, 2004, for all subject matter common to these applications. The disclosures of the above-mentioned applications are hereby incorporated by reference herein in their entirety.

FIELD OF THE INVENTION

The present invention relates to coating of tubes, and more particularly to a method for coating and/or renovating deteriorated or pitted tubes to extend tube life and enhance performance.

BACKGROUND OF THE INVENTION

Metal tubes have many different applications across a broad spectrum of industrial uses. One example use of metal tubes is in heat exchanger configurations. Fluids or gases running through and over the tubes in the heat exchanger provide heating or cooling as desired. One such heat exchanger application is in the form of a condenser. A condenser is generally utilized to cool steam as it passes over the heat exchanger tubes, which have cooling water passing therethrough. Corrosion, deterioration, erosion, pitting, and fouling of condenser tubes can play a major role in the effectiveness of the heat exchanger apparatus. In addition, maintenance costs, water, chemistry, replacement costs, and down time for repair, are other issues that relate to the performance of the tubes in the condenser or heat exchanger.

The purpose of the tubes in the heat exchanger configuration is to provide a barrier between the cooling media (in the form of water, most often) and the heated fluid. Additionally, these tubes facilitate heat transfer. Over the course of time, the inner surfaces of the tubes can pit or erode, and eventually may begin to leak and cease to be an effective barrier.

In an effort to prevent or delay the formation of pits or erosion within the tubes, epoxy coatings and other rebuilding compounds have been used. In particular, coatings have been used to protect tube interiors of copper based alloys at the inlet end where water turbulence in conjunction with entrained solids can cause accelerated erosion damage. Coatings extending three to twenty four inches into the tube have been successful in preventing degradation in this area.

In addition, more recent approaches have involved coating the entire length of the tubes. Since coatings often significantly reduce fouling and corrosion of the inner surfaces of the tubes, long term performance of coated tubes can ultimately be better than uncoated tubes. One potential side effect associated with the use of coatings is the extent to which heat transfer varies with different characteristics relating to the coatings. Various factors will affect how a coating affects heat transfer, such as thermal conductivity of the coating, interface effects between coating and tube, interface effects between multiple coatings, laminar flow effects, fouling effects and applied thickness. The thermal conductivity of the coating is a factor of the resin and filler blend in addition to how well integrated the resin and filler blend are to the other. Interface effects are a function of coating wetability and application parameters, such as temperature, humidity, dust control, and number of coats. In addition, the applied thickness of the coating varies with the number of coats. More specifically, conventionally two coats have been applied to the interior portions of the tubes, however, one coat is preferable because of the reduced thickness and reduced material costs. A full length tube coating currently is typically applied using a spraying process resulting in a coating thickness on the order of 2 mils to 5 mils. Such a thickness can penalize heat transfer capabilities, reducing them in the range of 19% before fouling factors are considered.

Once tubes are placed into service in a condenser, they develop protective oxide layers and begin to foul. If the fouling rate is rapid, then tube performance can degrade quickly. Depending on the design cleanliness assumptions and available capacity of tubes, such degradation of performance is tolerable to a certain extent until such time as the condenser must be cleaned or the tubes ultimately replaced. Coatings can prevent formation of oxides and also reduce the rate at which build-up occurs.

A significant concern relating to the degradation of heat transfer characteristics and overall performance of heat transfer tubes relates to the effect of pin holes or pitting due to corrosion of the inner surface of the tube. Currently, common materials utilized for tubes include copper alloys, stainless steel alloys, carbon steel, and titanium alloys. These tubes work by forming passive films in their intended service. When the passive film breaks down, corrosion occurs. Coatings placed on the inner surface of the tubes can obviate the need for a passivation layer to form.

SUMMARY OF THE INVENTION

There is a need for an improved device for use in the application of a coating to the inner surface of tubes to both provide a protective coating and repair or renovate corroded or pitted inner tube surfaces. The present invention is directed toward further solutions to address this need.

In accordance with one aspect of the present invention, a pig device for use in the application of a coating material to a tube includes a main body portion. A coating applicator is disposed at a first end of the main body portion. An end flange is disposed at a second end of the main body portion. The coating applicator is configured to distribute the coating material onto the tube, and the end flange is configured to wipe excess coating material from the tube, to result in a coating formed on an inner surface of the tube.

In accordance with aspects of the present invention, the pig device is configured to be motivated along the length of the tube to be coated using a variety of means. In one embodiment this pig device may be motivated along the length of the tube using a propulsion means driven by a pressure differential within the tube. One such example is the use of a compressed gas to propel the pig through the tube. In another embodiment the pig may be motivated along the length of the tube using a pressure differential such as a vacuum. In the alternative, the pig may be motivated using a mechanical means such as a flexible pull string. The coating applicator and the end flange are configured to apply a coating of uniform thickness along the interior of the tube. In one embodiment this coating may be an epoxy, phenolic, vinyl ester, poly ester, urethane, other polymer, and other suitable coating material. The surface of the pig device is modified to control application of the coating material.

In accordance with one embodiment of the present invention, a method of coating an inner surface of a tube includes providing a coating material in the tube. A pig device is provided in the tube, positioned to push the coating material through the tube. The pig device is motivated through the tube applying a uniform coating to the inner surface of the tube. The region of the tube upon which the coating is applied may be the entire length of the tube, or alternatively may be a portion of the tube length. For example, a coating may be applied to a region of a tube that suffers from turbulent fluid flows, which erode and degrade the inner tube walls in this region. Examples include regions of fluid direction change or regions where tube inner diameter changes drastically. Additionally, multiple pig devices sized and orientated to apply multiple layers of coating may be utilized such that a variety of coating layers can be applied to the inner region of the tube.

In accordance with one example embodiment of the present invention, a method of coating an inner surface of a tube includes preparing the inner surface of the tube. A coating material is provided in the tube. A pig device is provided in the tube, positioned to push the coating material through the tube. The pig device is moved through the tube to apply the coating material to form a coating inside the tube.

In accordance with aspects of the present invention, the pig device includes a coating applicator and an end flange configured to apply a coating. The surface of the pig device is modified to control application of the coating material. The pig device can be moved using a propulsion means such as a pressure differential or a mechanical means.

In accordance with further aspects of the present invention, preparing the inner surface of the tube can include cleaning the tube using a variety of chemical or mechanical means. One skilled in the art will readily recognize that numerous applicable chemical means exist, including but not limited to solvents, caustic or acidic compositions or etching solutions. Alternatively, mechanical means, as understood by one skilled in the art include but are not limited to abrasive blasting, high pressure water lancing (hydrolazing) or mechanical scrubbing. Furthermore, as dictated by the tube material, a combined chemical and mechanical cleaning may be employed.

Preparing the inner surface of the tube can further include pressure testing the tube. Pressure testing provides a means by which tube integrity can be evaluated and leaks from the interior of the tube to the exterior environment can be identified. Pressure testing can use a compressed gas or fluid to aid in evaluating tube integrity. Furthermore, the pressure testing fluid may further contain leak detecting materials including but not limited to photo reactive dye or chemical markers. Additionally, the preparation of the inner surface of the tube can further include depositing a primer layer on the inner surface. This primer layer can assist in establishing a bond between the inner tube wall material and the subsequent coating layer.

Providing coating material in the tube can include placing a quantity of the coating material in an end of the tube using a variety of means understood by one skilled in the art. For example, the coating material can be injecting into a stream of pressurized gas to distribute the coating along the inner surface of the tube.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1A:
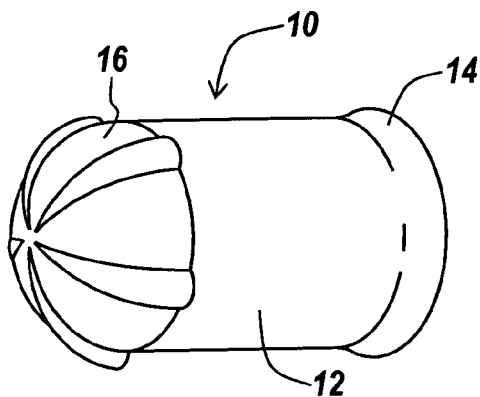
FIG. 1A is a perspective view of a pig device, according to one aspect of the present invention.

An illustrative embodiment of the present invention relates to a method for use in coating the inner surface of a pipe or tube with a coating. The method makes use of a pig device configured to be inserted into the tube with a selected quantity of coating material. The pig device is pushed through the tube using a propulsion means depending upon the particular embodiment of the present invention as well as the operating environment of the tube to be coated. While the pig device travels along the inner surface of the tube, the pig device transports the coating material and applies the coating material to the inner surface of the tube to form a coating which fills in any erosion elements, pits or compromised regions of the tube surface. The pig device can be used in on-site applications where the tube to be coated is in an installed configuration. Alternatively, the tubes can be coated using the same device and process in a manufacturing setting where the tubes are being fabricated for eventual installation into a heat exchanger, or for some other application requiring a coated tube.

FIGS. 1 through 7C, wherein like parts are designated by like reference numerals throughout, illustrate an example embodiment of a device for applying coatings and/or repairing inner surfaces of tubes according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

Pigging technology falls under the genres of fluid mechanics, pipeline technology, and chemical engineering. A general definition of pigging is the propulsion through a pipe of a mobile plug pig which can execute certain activities inside the pipe or tube. Pigging can be used, for example, to clean a pipe mechanically using brushes, or to check the interior condition of the pipe or tube using a video camera. In pigging, the contents of a pipeline are pushed by a snug-fitting plug, known as the pig, with the goal of removing the contents almost completely from the pipeline. The pig may be propelled through the pipe using a variety of propulsions means. For example the pig may be motivated through the pipe using a pressure differential provided by a compressed liquid or gas. In the alternative, the pig may be pulled through the pipe using a mechanical means such as a solid of flexible pulling means. The pig can be spherical, elongated, or composed of several parts. The pig is oversized relative to the pipe; thus, the pipe is sealed in front of and behind the pig. This enables the pig to be driven through the pipe by the gas or liquid propellant. The gas most frequently used is compressed air, and the liquid can be e.g. water, cleaning agent or product. One skilled in the art will readily recognize, however, that numerous alternative propulsion means may exist for propelling a pig through the tube.

It should be noted that the following description uses a heat exchanger as an example configuration for tubes that may require the functionality of the present invention. However, one of ordinary skill in the art will appreciate that heat exchanger tubes are merely one example application of tube structures having fluids flowing therethrough that may require a coating or a repair of the inner tube surface. Accordingly, the present invention is not limited to use with heat exchanger tubes, but can be used on a number of different types of tubes in a number of different configurations and having a number of different functions. The end result of the implantation of the present invention is that of a coated and/or repaired or renovated inner tube surface. As such, the invention is anticipated to be utilized in any application that may require such services.

FIG. 1 is a perspective illustration of a pig device 10 in accordance with one embodiment of the present invention. The pig device 10 is generally cylindrical in shape, as illustrated, for use in a normally configured cylindrical tube. However, one of ordinary skill in the art will appreciate that the cylindrical shape with circular cross-section can vary with the particular application, such that square, oblong, or other cross-sections can be embodied by the present invention. The present invention is thus not limited to the generally cylindrical shape.

The pig device 10 is formed of a main body portion 12 having a flanged end 14 at one end. The flanged end 14 increases the diameter dimension of the pig device 10 at the tip of the flange to perform a wiping function as later described herein. At an opposite end from the flanged end 14 the main body portion 12 supports a coating applicator 16. The coating applicator 16 can take the form of a substantially dome shaped end cap, as illustrated, or can have other forms suitable for applying the coating. The coating applicator 16 can be made of a number of different materials, including but not limited to plastics, composites, polymers, rubber, and the like. As described later herein, the coating applicator 16 spreads the coating onto the inner surface of a tube as a first step in a process for applying a coating and/or repairing pits or erosion elements in the tube.

Figure 2:
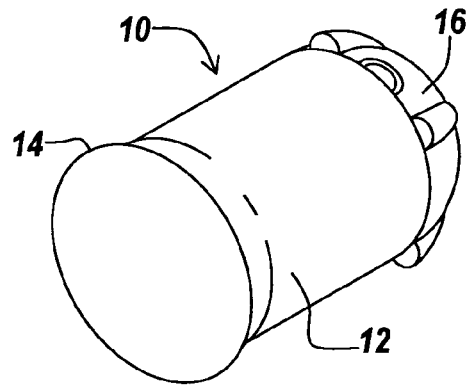
FIG. 2 is an alternate perspective view of the pig device, according to one aspect of the present invention.

FIG. 2 is a perspective illustration of the pig device 10 of FIG. 1, shown in a different angle perspective. As can be seen, the pig device 10 is shown as having no hollow inner cavities. However, one of ordinary skill in the art will appreciate that the primary purpose of the main body portion 12 of the pig device 10 is to provide a structure that can be pushed through a tube, not jam in the tube, and appropriately spread the coating as desired. Thus, the present invention is not limited to a solid structure, or even an enclosed structure, but can have hollow cavities in the pig device 10 to improve performance. The main body portion 12 can be made of a number of different materials, including but not limited to plastic, composite, metal, polymer materials, combinations thereof, and the like.

Figure 3:
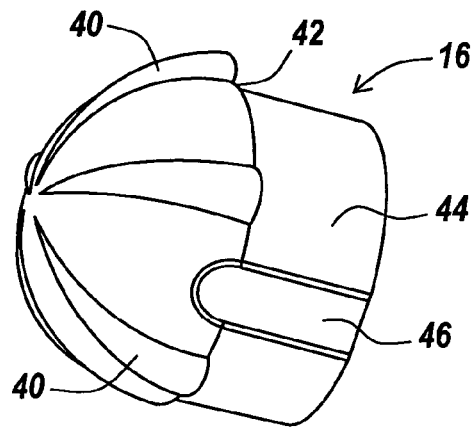
FIG. 3 is a perspective view of an end cap of the pig device, according to one aspect of the present invention.

FIG. 3 is a perspective illustration of the coating applicator 16 portion of the pig device 10. In the example illustration, the coating applicator 16 is a separate component from the main body portion 12 of the pig device 10. However, the coating applicator 16 and main body portion 12 can be a single component, as would be understood by one of ordinary skill in the art. The coating applicator 16 has several features, one of which is a series or plurality of ribs 40 extending from a base portion of the dome to the tip portion of the dome. The ribs 40 taper at the tip of the dome to end flush with the top of the dome. However, such a taper is not necessary for the implementation of the device.

Figure 4:
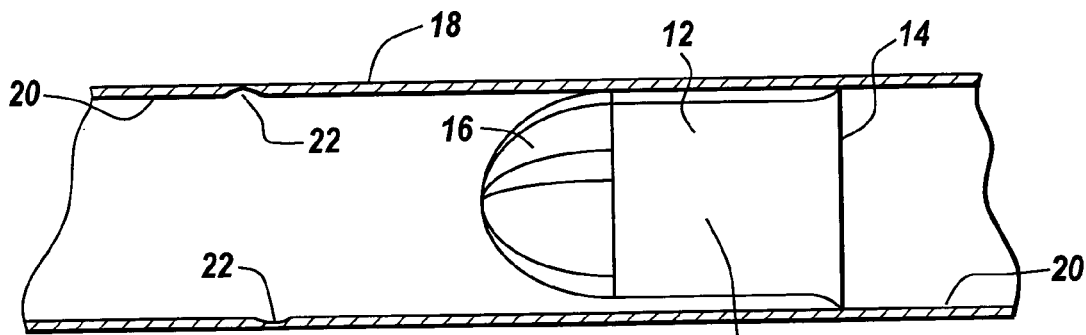
FIG. 4 is a diagrammatic illustration of the pig device in use in a tube, according to one aspect of the present invention.

FIG. 4 is a diagrammatic illustration of the pig device 10 shown inserted into a tube 18 or pipe. The tube 18 can be made of a number of different materials, such as metal, plastic, composite, ceramic, alloy, and the like, however in the case of heat exchanger tubes the most common material currently utilized is copper alloy, stainless steel, or titanium alloys. The tube 18 has an inner surface 20 formed by the walls of the tube 18. In the example illustrated, the tube 18 includes erosion elements 22 (e.g., pitting, deterioration, erosion, corrosion, pin, holes, and the like). The erosion elements 22 are representative of the types of defects that can occur in a heat exchanger, or other tube, over time. The erosion elements, as described above, can detract from the efficiency and effectiveness of the heat transfer by the tube 18, and can eventually lead to leak formation and cross-contamination of fluids (from inside the heat exchanger and outside the heat exchanger). Accordingly, there is often a desire to repair such an erosion element 22, or ultimately replace any tubes containing such erosion elements 22, to maintain tube performance.

Returning to FIG. 3, the dome shape of the coating applicator 16 helps to evenly distribute the coating applied within the tube 18 or pipe as later described. The ribs 40 of the coating applicator provide centering and stabilizing functionality of the pig device 10 as it travels through the tube 18. The ribs 40 are sized and dimensioned to approximate an effective diameter of the pig 10 of slightly less than the inner diameter of the tube 18. For example, the effective diameter taken across the depth of one rib 40 and continuing along the remaining diameter of the coating applicator 16 measures approximately 0.4 mm less than an inner diameter of the tube 18 in accordance with one example embodiment of the present invention. One of ordinary skill in the art will appreciate that the exact dimension of 0.4 mm is not a limiting dimension. Rather, the sizing of the ribs 40 and the coating applicator 16 is such that the coating applicator 16 can slide through the tube 18 without being frictionally wedged inside the tube 18. Likewise, the effective diameter of the coating applicator 16 must be large enough to provide stability and prevent the pig device 10 from tumbling within the tube 18.

In the example embodiment, the ribs 40 are of a placement such that no two ribs diametrically oppose, or substantially diametrically oppose, each other. This feature is accomplished by positioning an odd number of ribs 40 evenly spaced around the circumference of the dome. However, there can be an even number of ribs 40 having different spacing dimensions between ribs 40 to result in the same effect of not having any two ribs diametrically opposed, or substantially diametrically opposed. If two ribs were diametrically opposed, the effective diameter of the coating applicator 16 would be significantly increased at the point of the opposed ribs 40 (the effective diameter would be the total sum of the applicator diameter plus the depth/thickness of both ribs). If two ribs 40 are diametrically opposed, such an arrangement increases the likelihood that the pig device 10 will hang up within a tube if, for example, one of the ribs passes over a raised imperfection on the inner surface of the tube that presses the diametrically opposed rib against the opposing wall of the tube, thus frictionally halting progress of the pig device 10 through the tube. Positioning the ribs 40 in a non-diametrically opposed configuration reduces the likelihood of such an occurrence.

The coating applicator 16 further includes a lip 42 that extends outward from a main body portion 44. The lip 42 extends for the circumference of the coating applicator around the base of the dome. The lip 42 is sized and dimensioned to abut the main body portion 12 of the pig device 10, such that when the coating applicator 16 is placed within the main body portion 12 of the pig device, the surface of the main body portion 12 is flush with the lip 42. Such a configuration creates a substantially smooth surface along the outside of the pig device 10, thus avoiding the collection of coating material at the point of intersection between the coating applicator 16 and the main body portion 12.

The diameter of the main body portion 44 of the coating applicator 16 is sized and dimensioned to fit snugly within the inner cavity of the main body portion 12 of the pig device 10. To aid in the combining of the coating applicator 16 with the main body portion 12, a flat 46 is provided on one side of the coating applicator 16. The flat 46 enables any air trapped within the main body portion 12 of the pig device 10 as the coating applicator 16 is assembled together with the main body portion 12 to escape. As such, the coating applicator 16 can more easily be mounted within the main body portion 12 of the pig device 10.

As mentioned, the main body portion 44 of the coating applicator 16 fits snugly within the main body portion 12 of the pig device. The fit can be a friction fit, holding the pieces together. Alternatively, adhesives or other mechanical bonding methods can be used, as understood by one of ordinary skill in the art, to couple the coating applicator 16 to the main body portion 12 of the pig device 10.

Figure 5A:
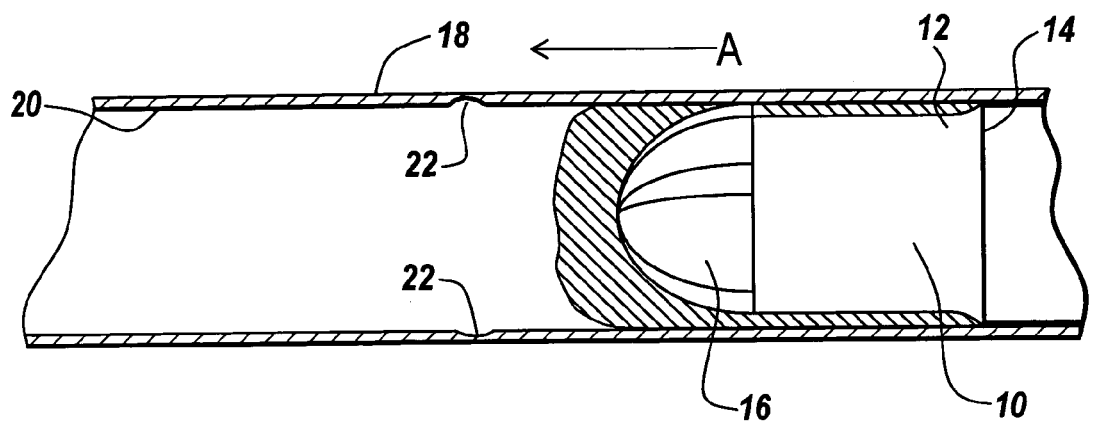
FIGS. 5A, 5B, and 5C are diagrammatic illustrations of the pig device in use, according to one aspect of the present invention.
Figure 5B:
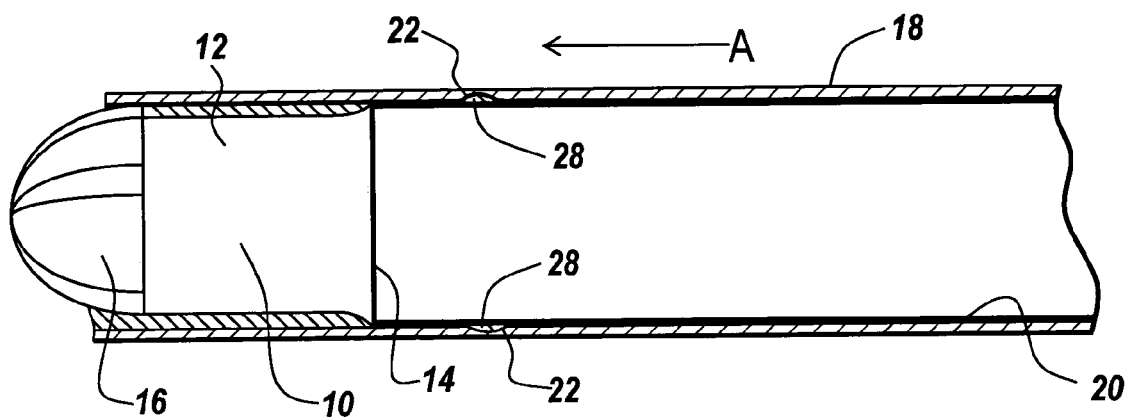
Figure 5C:
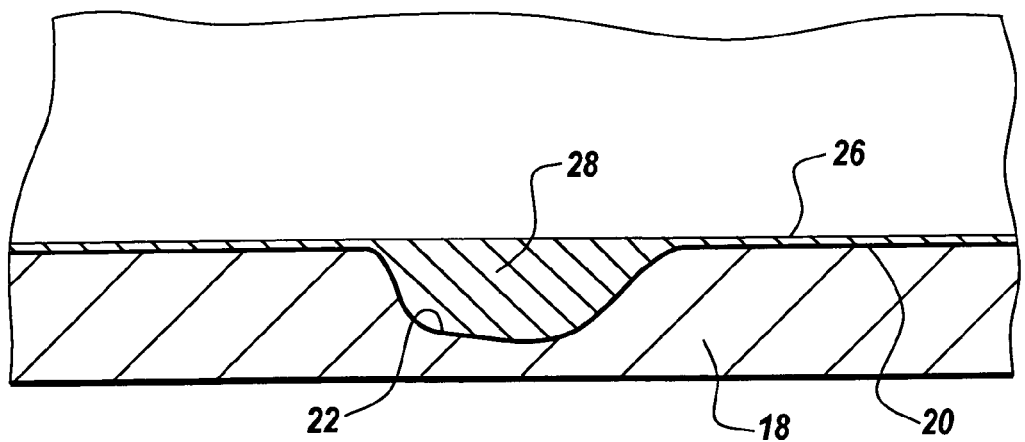

FIGS. 5A, 5B, and 5C illustrate the pig device 10 in use in conjunction with the tube 18, and also show the end result of a repair implemented by use of the present invention. In FIG. 5A, the pig device 10 is shown at one end of the tube 18. Prior to inserting the pig device 10 into the tube 18, a selected quantity of coating material 24 is placed in the tube 18. Alternatively, the coating material 24 can be placed on the end of the coating applicator 16 of the pig device 10. The amount of coating material 24 provided depends upon a number of factors, including the length of tube 18 to be coated, the thickness of the coating, the specific configuration of the pig device 10 being utilized to spread the coating material 24, the environment (such as humidity and temperature), the type of coating material 24 and associated coating properties (such as viscosity), and the like. Example materials forming the coating material 24 include but are not limited to epoxies, phenolics, vinal esters, poly esters, urethanes, other polymers, and other coating materials. The specific type of coating material utilized will depend largely on the purpose of the coating and the environment in which it is applied and to be maintained, as understood by one of ordinary skill in the art. For example, the coating material may contain numerous additives to improve performance of the tube or reduce further problems. A non-exhaustive list of suitable additives includes waxes, silicones, and other dry lubricants such as molybdenum disulfide.

Furthermore, to combat the growth of biological organisms along the inner surface of the tube, various algicides, biocides and fungicides can be added to the coating which kill or deter the growth of these organisms. Growth of biological organisms such as algae, fungi, bacterial and other micro organisms along the inner surface of the tube may result in fouling of the tube surface as well as the creation of obstructions within the tube. Fouling and obstructions such as this can reduce heat transfer within the tube as well as restrict or prohibit fluid flow. Furthermore, the existence of biological growth can further induce various types of corrosion along the tube wall, thereby resulting in deterioration and eventual tube failure. The introduction of algicides, biocides and fungicides into the coating material thereby serves to prevent or minimize such problems. Suitable substances for curbing biological growth include, but are not limited to ortho-phenylphenol(OPPS); isothiazolinone derivatives(such as 2-n-octyl-4-isothiaszolin-3-1 (OIT); guanides and biguanides; carbamates and dithiocarbamates; copper, sodium or zinc pyrithione; benzimidazoles; n-haloalkylthio compounds; 1-(3-chloroallyl)-3,5,7-tri-aza-1-azionia-adamantanechloride; tetrachloroisophthalonitriles; cis[1-(3-chloroallyl)-3,5,7-tri-aza-1-azonia-adamantane]chloride and 2,2-dibromo-3-nitropropionamide(DBNPA); and quaternary ammonium compounds.

Additionally, the coating materials of the present invention may be of varying viscosity. Unlike traditional coating methods, wherein the coating material is sufficiently thinned using a solvent, the coating of the present invention may be used in an un-thinned high viscosity state. The use of a thinning solvent aids in the flow of existing coating throughout the tube and helps control cure time properties. Following the coating of tube with a thinned coating, one must await the evaporation of the solvent from the coating material for the coating to cure. As heat exchanger tubing has a very low diameter to length ratio to maximize surface area for heat transfer, this confined space oftentimes makes it difficult for a solvent to migrate out of a coating. Further compounding this difficulty are any pits which may be filled with the solvented coating, whereby the likelihood that some solvent may be trapped in these pits is greatly increased.

In contrast, as the coating in the present invention is pushed through the tube, coating with higher initial viscosities can be used in an un-thinned state. For example, coatings with viscosities of 100,000 cps or greater can be readily used. In light of this, the risks associated with incomplete solvent removal are eliminated.

As shown in FIG. 5B, the pig device 10 is pushed or pulled along the tube 18 in the direction of arrow A, leaving behind a coating 26 formed of a thin layer of the coating material 24. The direction of the pig device 10 passing through the tube 18 is inconsequential to the implementation of the invention so long as the pig device 10 leads with the coating applicator 16. To describe the action of the pig device 10, the following is provided. The coating material 24 collects around the coating applicator 16. This action is due to drag and frictional forces pushing the coating material 24 into the pig device 10 as it travels through the tube 18. As the pig device 10 moves through the tube 18, the spaces between the ribs 40 of the coating applicator 16 let an amount of the coating material 24 pass by the coating applicator 16 and collect along the main body portion 12 of the pig device 10, between the main body 12 and the inner surface 20 of the tube 18 before the flanged end 14. As the pig device 10 continues in the direction of arrow A, the flanged end 14 comes along and wipes the coating material 24 to form the coating 26.

Even distribution of the coating material 24 is accomplished by the combination of the coating applicator 16 controlling the initial amount of coating material 24 being let into the region between the main body portion 12 and the action of the flanged end 14 wiping against the inner surface 20.

In the instance of the existence of the erosion element 22, the pig device 10 can be used to provide a coating patch 28. In short, the coating material 24 is controlled by the coating applicator 16 to the extent that a sufficient amount is available to fill the erosion element 22 in the form of a pit or imperfection as it exists in the tube 18 and as the pig device 10 comes across the pit or imperfection. As the pig device 10 passes over the erosion element 22, the coating material 24 fills in any voids. Then as the flanged end 14 passes over the erosion element 22, any excess coating material 24 is wiped away leaving sufficient material to form the coating patch 28, filling the erosion element 22. In areas on either side of the erosion element 22 the coating 26 is applied to the inner surface 20.

The pig device 10 is pushed or propelled through the tube 18 using a propulsion means including a pressure differential or a mechanical mechanism. One example of a pressure differential driven propulsion means includes the use of a compressed gas as a propellant. The propellant is applied at the flange end 14 of the pig device 10. As the propellant is applied, the pig device 10 is motivated through the tube 18 to a far end. Depending on the particular tube configuration, the pig device 10 can continue, through a connector, to another tube, or alternatively exit the tube 18.

In addition, the pig device 10 can be motivated through the tube using a mechanical means such as a line, wire, string, tape, rod, and the like, made of any number of different materials, including synthetic, non-synthetic, metal, plastic, composite, woven, non-woven, etc. Accordingly, the present invention is not limited by the particular material or structure of the device utilized to pull the pig device 10 through the tube 18.

The use of the pig device 10 provides a user with added control over the dimensions of the resulting coating 26. More specifically, the pig device 10, by varying such portions as the coating applicator 16 and the end flange 14, can be modified to specifically result in a desired coating having a predetermined and substantially consistent thickness and distribution. For example, the coating applicator 16 can be varied by material and size to let selected amounts of the coating material to pass by for application. In addition, the diameter or width of the main body portion 12 can be varied to control the amount of coating material 24 being exposed to the end flange 14. In addition, the dimensions and shape of the end flange 14, and of the main body portion 12, can be varied to control the distribution and amount of material being deposited on the inner surface 20.

The configuration of the pig device 10, with the wiping action of the end flange 14, enables substantially improved control over the coverage and thickness of the coating 26. Coatings having a thickness on the order of less than 0.25 mils can be achieved using the pig device 10 of the present invention. This results in the ability to provide a coating that has a substantially reduced effect on heat transfer properties of the tube where coating covers the inner surface in areas of otherwise good condition, while also repairing pits and other erosion elements 22. Thus, the overall effect of use of the pig device 10 of the present invention on a tube in otherwise good condition is to provide a coating of thickness much smaller than past processes, with minimal heat transfer effect, but improved durability and ability to repel corrosion and other fouling or deteriorating elements. The overall effect of use of the pig device 10 of the present invention on a tube having erosion elements 22 that are detracting from tube performance is to repair and renovate the tube to restore the tube to a much improved condition, delaying the need to shut down the system and replace the tube.

Figure 6A:
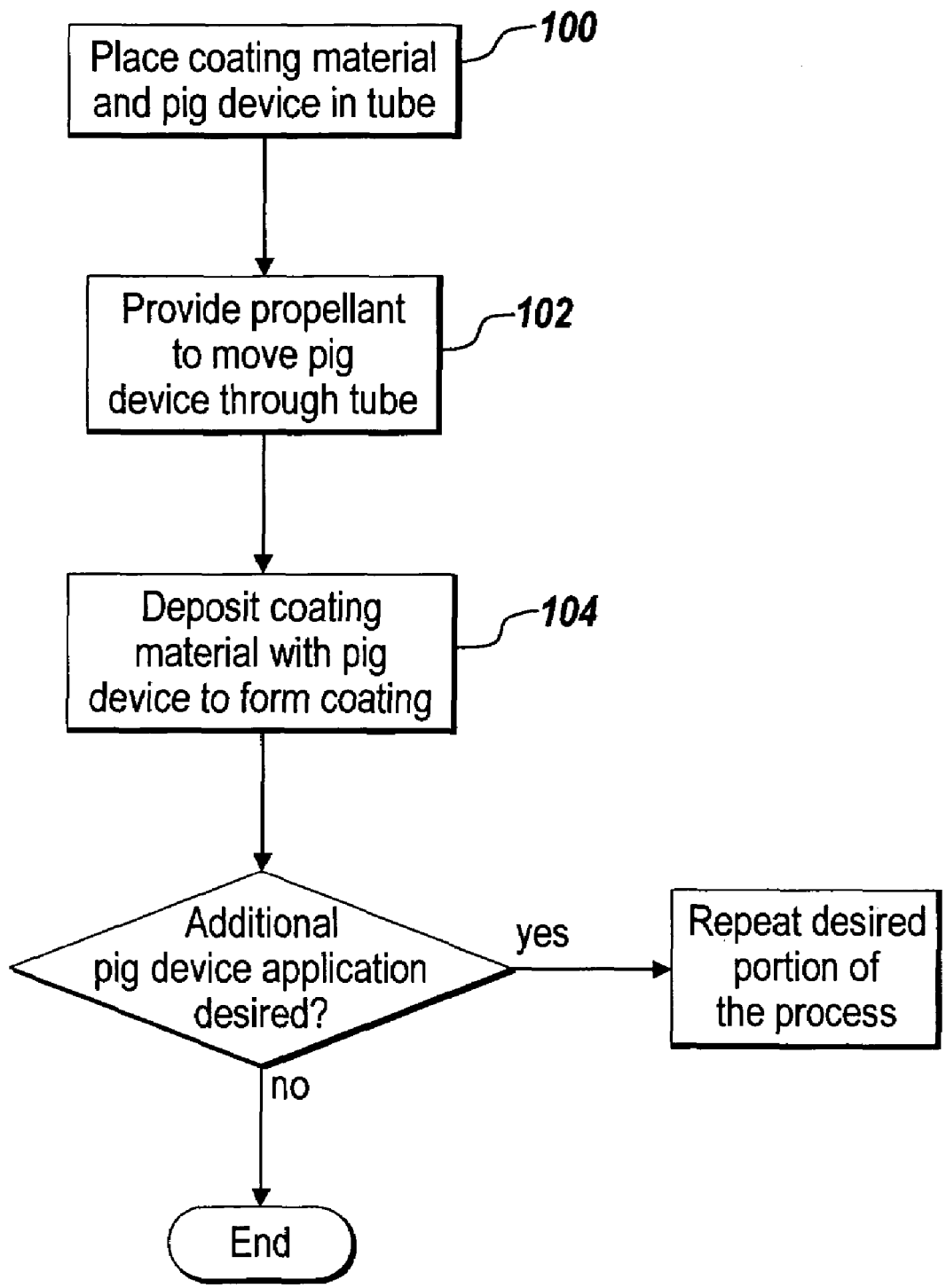
FIGS. 6A, 6B, and 6C are flowcharts illustrating one method of use of the pig device, according to one aspect of the present invention.

FIG. 6A is a flowchart illustrating one example method of using the pig device 10 in accordance with one embodiment of the present invention. The coating material 24 and pig device 10 are initially provided in the interior portion of the tube 18 (step 100). The propulsion means is further provided, motivating the pig device 10 through the tube 18 (step 102). As the pig device 10 travels along the tube 18, the coating material 24 is deposited on the inner surface 20 of the tube 18 to form the coating 26 (step 104). If desired, the process can be repeated to provide additional layers of coating material 24 (step 106). It should be noted that if additional layers of coating material 24 are applied, the layers can be formed of coating material 24 that is of a different type, or the same as the initial coating material 24. In addition, if the process is repeated, different pig devices 10, having different properties or characteristics can be used to form coating layers having different properties. Furthermore, depending on the coating material 24, time may be required to allow for the coating to set and cure.

Figure 6B:
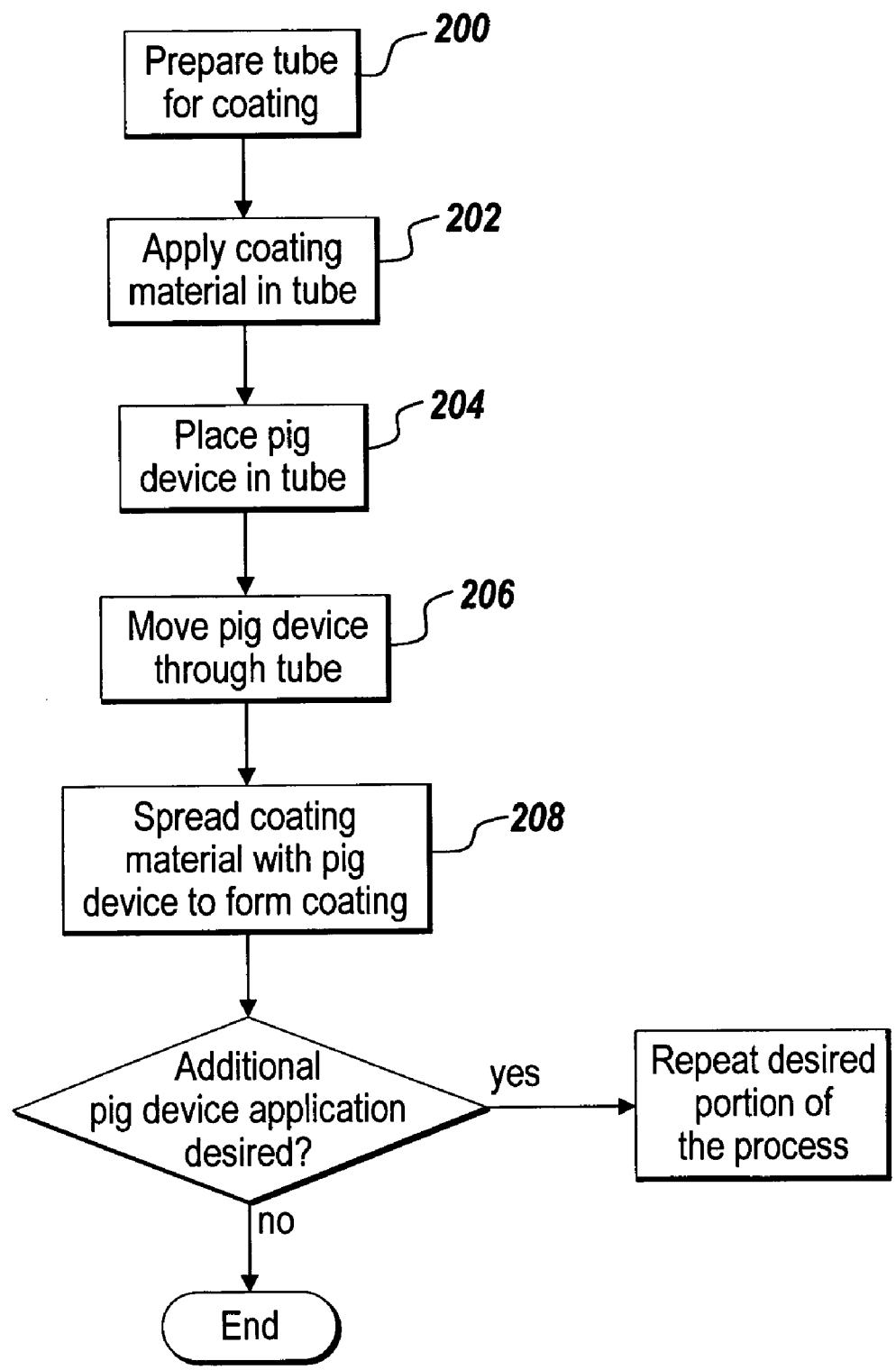

FIG. 6B is a flowchart illustrating another example method of using the pig device 10 in accordance with one embodiment of the present invention. The tube is prepared for coating (200). The method of preparation can vary, and is further detailed below and shown in FIG. 6C.

The coating material 24 is applied to the tube 18 (step 202). The application of the coating material 24 can vary in method. For example, the coating material can be provided by placing a quantity in one end of the tube 18 for subsequent deposition throughout the tube 18 by the pig device 10. Alternatively, pressurized air (or other gas) can be introduced into the tube and the coating material 24 injected into the pressurized stream distributing the coating material 24 along the inside surface of the tube 18. Such an application method provides a pre-coating of the tube in a thicker and less even fashion relative to the final coating after the pig device 10 is sent through the tube 18. However, the application of the coating material 24 in this fashion reduces or eliminates dripping of the coating material 24 out of the end of the tube 18 if applied as a quantity of material in one end of the tube 18, as described earlier, in addition to other advantages.

The pig device 10 is provided in the interior portion of the tube 18 (step 204). The pig device 10 is motivated along the length of the tube 18 (step 206). The method for motivating the pig device 10 can vary, as understood by one of ordinary skill in the art. As described in the above embodiments, a pressurized propellant can be used to blow the pig device 10 through the tube 18. Alternatively, a rod can be used to push or pull the pig device 10 through the tube 18. In further alternative, a string, line, cord, fiber, or other similar structure can be affixed to the pig device 10 (such as by adhesive, magnet, or mechanical fastening) and the pig device 10 is then pulled through the tube 18. This method of propelling is useful if there are deep pits or holes completely through the wall of the tube 18 that require patching. The slower movement of the pig device 10 enables a more thorough covering of the erosion element 22 in certain situations.

As the pig device 10 travels along the tube 18, the coating material 24 is deposited on the inner surface 20 of the tube 18 to form the coating 26 (step 208). If desired, the process can be repeated to provide additional layers of coating material 24 (step 210). It should be noted that if additional layers of coating material 24 are applied, the layers can be formed of coating material 24 that is of a different type, or the same as the initial coating material 24. In addition, if the process is repeated, different pig devices 10, having different properties or characteristics can be used to form coating layers having different properties. Furthermore, depending on the coating material 24, time may be required to allow for the coating to set and cure.

For example, in situations where there are deep or pass through erosion elements 22, it may be useful to apply a primer coating to the tube 18 prior to applying the coating material 24 to form the coating 26. The primer coating can have a lesser viscosity than the coating material 24, so that it better penetrates and fills the erosion element 22. The primer coating can be applied in as the first coating, and the process is then repeated (step 210) to apply the coating material 24. In addition, multiple layers of coating material 24 can likewise be applied in repeated applications and depositions, as would be understood by one of ordinary skill in the art.

The thickness of the coating 26 is controlled using several different variables. The size of the pig device 10 relative to the size of the tube 18 is one way that the coating 26 thickness can be controlled. A pig device 10 having an effective rib diameter and underlying main body portion 12 diameter that approaches the inner diameter of the tube 18 will let less material pass by, and thus apply a thinner coating to the tube 18. Alternatively, a pig device 10 having an effective rib diameter, and especially an underlying main body portion 12 diameter that is substantially less than the inner diameter of the tube 18 will supply a larger amount of coating material 24 is provided to the flanged end 14 of the pig device 10, resulting in a thicker coating 26 application. Likewise, the diameter of the flanged end 14 can be altered to have a tighter fit against the inner surface 20 of the tube 18, and thus apply a thinner coating 26, or a looser fit against the inner surface 20 of the tube 18, and thus apply a thicker coating 26. However, it should be further noted that an oversized pig that is sufficiently oversized can apply a thicker coating. More specifically, if the flanged end 14 of the pig device 10 is so oversized as to press against the tube 18 in a manner that forces the flanged end 14 to substantially flex or lay over continuously even when not moving through the tube, the resulting coating 26 is thicker. In addition, a relatively greater amount of force is required to push the pig device 10 through the tube 18 because of the increased frictional forces caused by the oversized flanged end 14 pressing against the tube 18.

Another variable for adjusting the coating thickness is the velocity of the pig device 10 through the tube 18. A pig device moving in the range of about 10 feet/sec is moving slower than a pig device 10 moving in the range of about 50 feet/sec or 70 feet/sec. The slower moving pig device 10 applies a thinner coating 26 because the end flange 14 is not yielding as significantly to friction forces generated by the speed of a faster moving pig device 10 against the coating 26 and the inner surface 20. Lower friction forces bending the end flange 14 away from the inner surface 20 results in a thinner coating 26.

Another variable for adjusting the coating thickness is the viscosity of the coating material 24. If the coating material 24 has a greater viscosity, the material is thicker and when applied remains in a thicker coating 26. When the coating material 24 has a lesser viscosity, the coating material can be applied more thinly, and thus result in a relatively thinner coating 26.

Figure 6C:
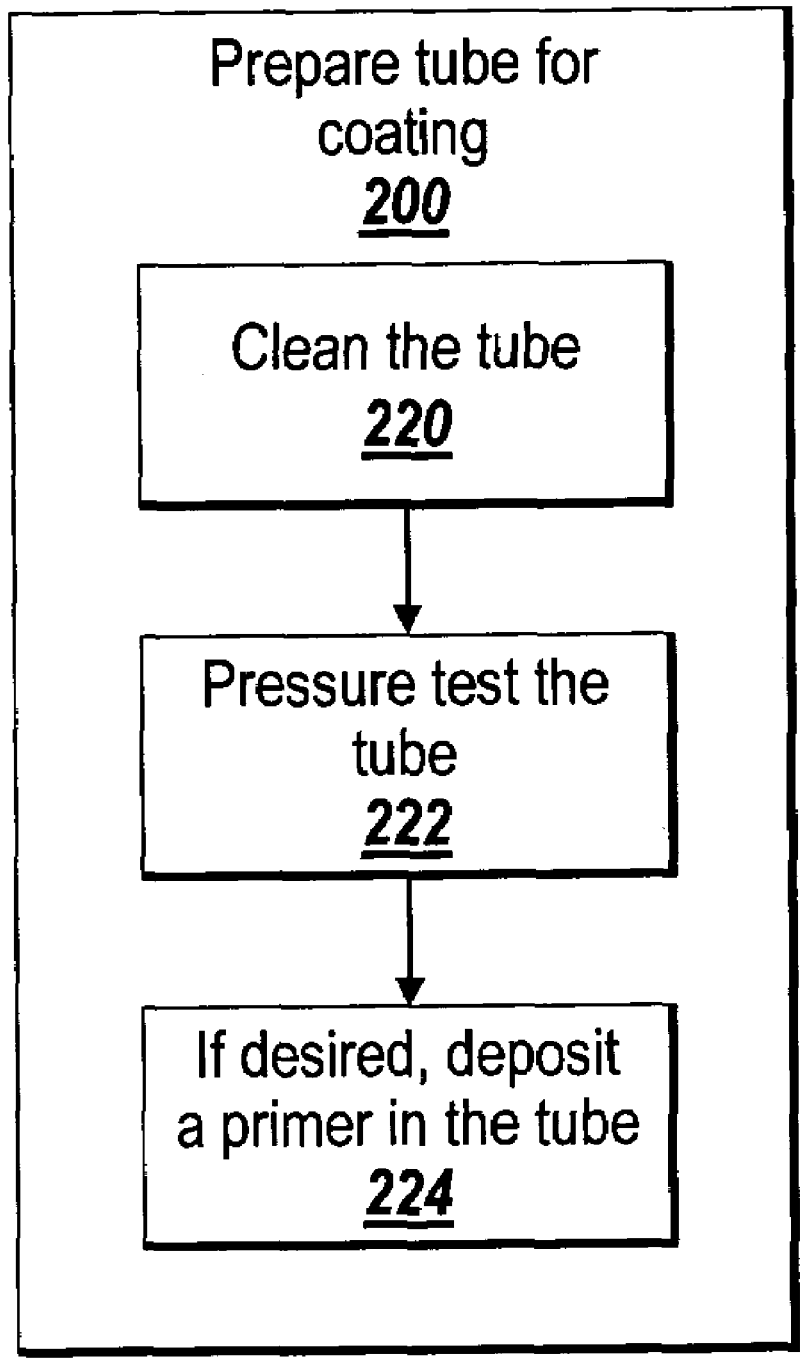

FIG. 6C is a flowchart illustrating example embodiments relating to the step 200 of preparing the tube for coating. The preparation of the tube can take many different forms. For example, the tube 18 can be cleaned (step 220), using such conventional materials and processes include cleaning the tube using a variety of chemical or mechanical means. One skilled in the art will readily recognize that numerous applicable chemical cleaning means exist, including but not limited to the use of solvents, caustic compositions or etching solutions. Alternatively, mechanical means, as understood by one skilled in the art include but are not limited to abrasive blasting or mechanical scrubbing. Furthermore, as dictated by the tube material, a combined chemical and mechanical cleaning may be employed.

The tube 18 can be pressure tested (step 222) after cleaning. The cleaning process sometimes opens up holes in the tube 18 in instances where there is substantial corrosion. Pressure testing provides a means by which tube integrity can be evaluated and leaks from the interior of the tube to the exterior environment can be identified. Pressure testing can use a compressed gas or fluid to aid in evaluating tube integrity. Furthermore, the pressure testing fluid may further contain leak detecting materials including but not limited to photo reactive dye or chemical markers.

If desired, the preparation process can include the deposition of a primer on the inner surface 20 of the tube 18 as discussed above. The primer can be used to prepare the surface for the coating 26, and more effectively fill in extensive erosion elements 22 because it can be less viscous than the coating material 24. This primer layer can further assist in establishing a bond between the inner tube wall material and the subsequent coating layer.

It should be noted that the primer material and the coating material discussed herein can be made of a number of different substances. It has been found that an epoxy based coating material is highly effective to form the coating 26. The primer material can be formed of a resin and hardener combination, with little or no solids, which are otherwise found in the epoxy coatings.

It should additionally be noted that the preparation of a tube for coating may included steps beyond those represented in FIG. 6C. For example, in critical applications ultrasonic or non-destructive testing of the tube may be accomplished to ensure that the tube walls are not below a minimal working thickness. One skilled in the art will readily recognize that these numerous additional steps may be utilized in preparing the tube for coating 200.

Figure 7A:
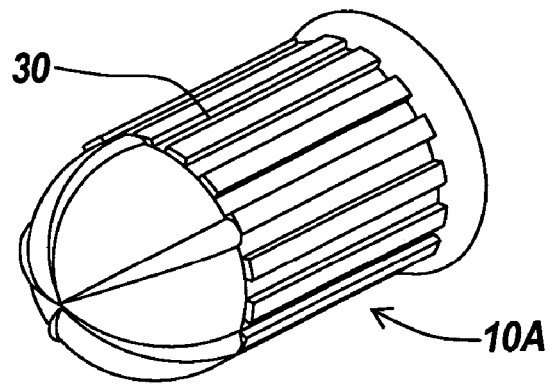
FIGS. 7A, 7B, and 7C are perspective illustrations of alternative pig device embodiments, according to aspects of the present invention.
Figure 7B:
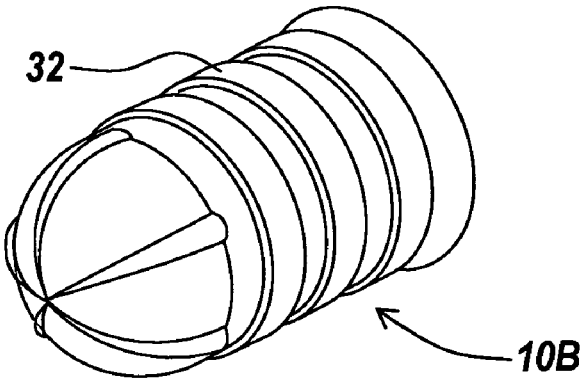
Figure 7C:
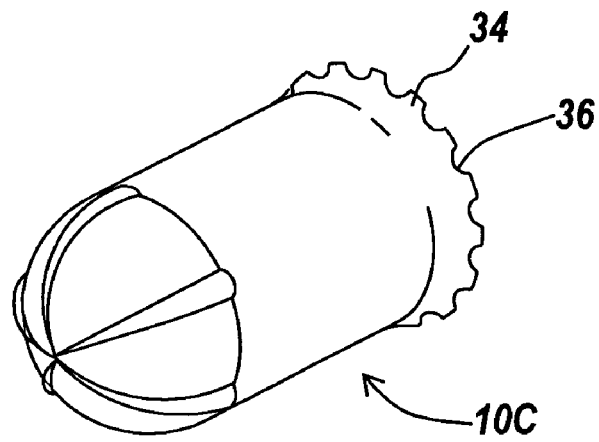

FIGS. 7A, 7B, and 7C illustrate several example alternative embodiments of the pig device 10 in the form of pig device 10A, pig device 10B, and pig device 10C. Pig device 10A has the additional aspect of longitudinal surface features 30. Pig device 10B has the additional aspect of latitudinal surface features 32. The addition of the longitudinal surface features 30 and latitudinal surface features 32 are representative of a variety of different alternative embodiments in which the surface of the main body portion 12 is modified to have an impact on the distribution of the coating material 24 by the pig device. One of ordinary skill in the art will appreciate that different orientations and combinations of surface features, such as those indicated in FIGS. 7A and 7B, in addition to others not specifically described or illustrated, are possible in accordance with the present invention. Accordingly, the present invention is not limited to only the example embodiments illustrated.

In FIG. 7C, an end flange 34 includes a plurality of valleys 36. As the flange 34 passes over the coating material 24, the valleys 36 in the flange 34 form ridges in the coating 26 that results on the inner surface 20 of the tube 18. The particular pattern resulting in the coating 26 can vary, as understood by one of ordinary skill in the art, based on the shape of the flange. Such a flange 34 can be useful if multiple passes of the pig device are to be implemented. The first application of the coating material 24 can have the primary purpose of depositing the coating material 24 in a predetermined pattern of ridges, while subsequent passes of the pig device can smooth out, or otherwise modify, the resulting coating. Alternatively, the ridges or other patterns formed in the coating can form the final configuration of the coating, if such ridges or patterns are desired.

Initial implementations of the pig device 10 to provide a coating in a tube 18 have resulted in a coating of approximately less than 0.25 mils thickness that provided consistent coverage of the inner surface 20. Heat transfer analysis of the coated tube revealed minimal effect on heat transfer properties. Tubes having one or more pits were quickly repaired by use of the pig device 10 and an epoxy coating to patch the pits with a durable patch, thus extending the work life of the tube.

Accordingly, the present invention is useful in that the implementation of the pig device to apply a coating or a coating patch enables substantially improved control over the coverage and thickness of a coating on an inner surface of a tube. Where prior methods have resulted in a minimum coating thickness of 2 mils to 5 mils, the present invention can achieve a much thinner coating, on the order of less than 0.25 mils. Thus, the resulting coating has far lesser negative effects on heat transfer properties of the tube. In addition, the pig device can be run through the tube multiple times to provide layers of coating if a more durable, or thicker coating is desired. The compressed fluid in the form of gas or liquid quickly propels the pig device through the tube, efficiently applying the coating to the inner surface.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. A method of coating an inner surface of a tube, comprising:
   providing a coating material in the tube;
   positioning a single pig device in the tube, sized and orientated to disperse the coating material along the inner service of the tube, said single pig including: a main body portion having a first end and a second end; a coating applicator disposed at said first end, said coating applicator having a plurality of longitudinally extending spaced apart ribs enabling the passage of the coating material beyond said applicator; and an end flange disposed at said second end, said end flange wiping the coating material to form a single layer coating, and
   motivating the pig device through the tube to apply the coating material to form said single layer coating on the inner surface of the tube.

2. The method of claim 1, wherein a predefined amount of a coating is introduced into the end of the tube prior to motivation of the pig device through the tube.

3. The method of claim 1, wherein the coating is one of an epoxy, phenolic, vinyl ester, a poly ester, a urethane, and/or a polymer.

4. The method of claim 1, wherein the applied coating includes an additive for use in coating the tube.

5. The method of claim 4, wherein the additive is a biocide, a fungicide and/or algaecide.

6. The method of claim 1, wherein a single coating is applied to the inner surface of the tube.

7. The method of claim 1, wherein a plurality of single layer coatings are applied to the inner surface of the tube.

8. The method of claim 1, further comprising dispersing the coating material along the inner surface of the tube prior to the motivation of the pig device through the tube.

9. The method of claim 8, further comprising dispersing the coating material along the inner surface of the tube using a compressed fluid or compressed gas.

10. The method of claim 1, wherein the pig device is motivated through the tube using a propulsion mechanism.

11. The method of claim 10, wherein the propulsion mechanism for motivating the pig device through the tube is a pressure differential and/or a mechanical mechanism.

12. The method of claim 1, wherein the provided coating is applied to a portion of the tube length.

13. The method of claim 1, wherein the provided coating thickness can be controlled by varying pig size, pig speed and/or material viscosity.

14. The method of claim 1, wherein the provided coating has a minimal effect on heat transfer of the tube.

15. The method of claim 1, wherein the provided coating fills erosion elements in the tube walls.

16. The method of claim 1, wherein the provided coating bridges cracks within the inner surface of the tube.

17. The method of claim 1, further comprising depositing a primer layer onto the inner surface of the tube prior to the application of the coating material.

18. The method of claim 1, further comprising cleaning the inner surface of the tube prior to providing the coating material.

19. The method of claim 18, wherein the inner surface of the tube is cleaned using at least one method of cleaning selected from a group of cleaning methods comprising cleaning with mechanical means, abrasive cleaning, ultrasonic cleaning, chemical cleaning, hydrolazing and solvent-based cleaning.

20. The method of claim 1, further comprising evaluating the integrity of the tube prior to providing the coating material.

21. The method of claim 20, wherein the integrity of the tube is evaluated using at least one method of evaluation selected from a group of evaluation methods comprising a pressure test, a dye penetrant test, and a non-destructive testing procedure.

22. A method of preparation and application of a coating to the inner surface of a heat exchanger tube, comprising the steps of:
   cleaning the inner surface of said heat exchanger tube;
   evaluating the integrity of said heat exchanger tube;
   providing a coating material in said heat exchanger tube;
   inserting a pig device in said heat exchanger tube, sized and oriented to disperse the coating material along the inner service of the tube, said pig device being comprised of a single plastic pig, said single pig including: a main body portion having a first end and a second end; a coating applicator disposed at said first end of the main body portion, said first end being the end of said pig that is first inserted into the tube, said coating applicator being conical in shape and having a plurality of longitudinally extending spaced apart ribs enabling the passage of the coating material beyond said coating applicator; and an end flange disposed at said second end of the main body portion;

motivating the pig device through the tube to apply the coating material to form a thin, single layer coating on the inner surface of the tube, wherein said pig end flange wipes the coating material as the pig device is motivated through the tube to form a single layer coating; and wherein said single layer coating is approximately greater than 0 mils but less than or equal to 0.25 mils thick thereby having a minimal effect on the heat transfer properties of said tube.

* * * * *

UNITED STATES PATENT AND TRADEMARK OFFICE
CERTIFICATE OF CORRECTION

PATENT NO. : 7,270,847 B2  Page 1 of 1
APPLICATION NO. : 11/156090
DATED : September 18, 2007
INVENTOR(S) : Michael J. Horn It is certified that error appears in the above-identified patent and that said Letters Patent is hereby corrected as shown below:

Column 14, Claim 7, Line 10, after "plurality of", please insert --thin,--.

Signed and Sealed this

Twenty-fifth Day of December, 2007

JON W. DUDAS
*Director of the United States Patent and Trademark Office*